(12) United States Patent
Wilcox et al.

(10) Patent No.: US 7,841,750 B2
(45) Date of Patent: Nov. 30, 2010

(54) LIGHT-DIRECTING LENSING MEMBER WITH IMPROVED ANGLED LIGHT DISTRIBUTION

(75) Inventors: Kurt S. Wilcox, Libertyville, IL (US); Chris Strom, Racine, WI (US)

(73) Assignee: Ruud Lighting, Inc., Racine, WI (US)

( * ) Notice: Subject to any disclaimer, the term of this patent is extended or adjusted under 35 U.S.C. 154(b) by 294 days.

(21) Appl. No.: 12/184,306

(22) Filed: Aug. 1, 2008

(65) Prior Publication Data

US 2010/0027271 A1 Feb. 4, 2010

(51) Int. Cl.
*F21V 5/04* (2006.01)
*F21V 5/08* (2006.01)

(52) U.S. Cl. .................. 362/334; 362/309; 362/311.06; 362/332

(58) Field of Classification Search ......... 362/222–224, 362/307–309, 311.02, 311.06–311.01, 311.12, 362/326, 332, 334–340
See application file for complete search history.

(56) References Cited

U.S. PATENT DOCUMENTS

| | | | |
|---|---|---|---|
| 1,404,004 | A | 1/1922 | Benford |
| 1,535,486 | A | 4/1925 | Lundy |
| 3,497,687 | A | 2/1970 | Hermann |
| 3,625,615 | A | 12/1971 | Wilson |
| 4,254,453 | A | 3/1981 | Mouyard et al. |
| 4,336,580 | A | 6/1982 | Mouyard et al. |
| 4,345,308 | A | 8/1982 | Mouyard et al. |
| 4,650,998 | A | 3/1987 | Martin |
| 4,767,172 | A | 8/1988 | Nichols et al. |
| 4,845,600 | A | 7/1989 | Matsumura et al. |
| 4,862,330 | A | 8/1989 | Machida et al. |

(Continued)

FOREIGN PATENT DOCUMENTS

EP 1 107 210 6/2001

(Continued)

OTHER PUBLICATIONS

Excerpts of International Search Report and Written Opinion for PCT/US09/04190. Date: Sep. 2, 2009, 3 pages.

(Continued)

*Primary Examiner*—Ismael Negron
(74) *Attorney, Agent, or Firm*—Jansson Shupe & Munger Ltd (57) ABSTRACT

A light-directing lensing member for off-axial preferential-side distribution of light from a light emitter having an emitter axis, including a base end with a perimeter-loop line defining a main plane transverse the emitter axis, and an outer surface configured for refracting light from the emitter in a predominantly off-axis direction toward the preferential side. The outer surface includes a major lens-portion and an axially-located minor lens-portion. The major lens portion outer surface has a front region centered on the front side, a back region centered on the back side, and a middle region around the emitter axis and contiguous with the front and back regions. The minor lens-portion has a surrounding-loop surface extending from the middle region transverse the main plane and terminating at an end surface configured to direct substantially axially-parallel light from the emitter in off-axis direction toward the preferential side.

19 Claims, 9 Drawing Sheets

U.S. PATENT DOCUMENTS

| | | |
|---|---|---|
| 4,935,665 A | 6/1990 | Murata |
| 4,941,072 A | 7/1990 | Yasumoto et al. |
| 5,001,609 A | 3/1991 | Gardner et al. |
| 5,013,144 A | 5/1991 | Silverglate et al. |
| 5,014,165 A | 5/1991 | Naganawa |
| 5,062,027 A | 10/1991 | Machida et al. |
| 5,127,728 A | 7/1992 | Warren et al. |
| 5,174,649 A | 12/1992 | Alston |
| RE34,254 E | 5/1993 | Dragoon |
| 5,289,082 A | 2/1994 | Komoto |
| 5,349,504 A | 9/1994 | Simms et al. |
| 5,592,578 A | 1/1997 | Ruh |
| 5,784,209 A | 7/1998 | Manabe |
| 5,813,752 A | 9/1998 | Singer et al. |
| 5,865,529 A | 2/1999 | Yan |
| 5,924,788 A | 7/1999 | Parkyn, Jr. |
| 5,995,291 A | 11/1999 | Togino |
| 6,097,549 A | 8/2000 | Jenkins et al. |
| 6,229,160 B1 | 5/2001 | Krames et al. |
| 6,244,727 B1 | 6/2001 | Ryan, Jr. et al. |
| 6,250,787 B1 | 6/2001 | Matubara |
| 6,273,596 B1 | 8/2001 | Parkyn, Jr. |
| 6,274,924 B1 | 8/2001 | Carey et al. |
| 6,283,613 B1 | 9/2001 | Schaffer |
| 6,296,376 B1 | 10/2001 | Kondo et al. |
| 6,323,063 B2 | 11/2001 | Krames et al. |
| 6,361,190 B1 | 3/2002 | McDermott |
| 6,361,192 B1 | 3/2002 | Fussell et al. |
| 6,443,594 B1 | 9/2002 | Marshall et al. |
| 6,473,238 B1 | 10/2002 | Daniell |
| 6,481,130 B1 | 11/2002 | Wu |
| 6,498,355 B1 | 12/2002 | Harrah et al. |
| 6,502,956 B1 | 1/2003 | Wu |
| 6,504,301 B1 | 1/2003 | Lowery |
| 6,541,800 B2 | 4/2003 | Barnett et al. |
| 6,547,423 B2 | 4/2003 | Marshall et al. |
| 6,550,940 B2 | 4/2003 | Kamiya et al. |
| 6,554,451 B1 | 4/2003 | Keuper |
| 6,570,190 B2 | 5/2003 | Krames et al. |
| 6,598,998 B2 | 7/2003 | West et al. |
| 6,601,962 B1 | 8/2003 | Ehara et al. |
| 6,607,286 B2 | 8/2003 | West et al. |
| 6,616,299 B2 | 9/2003 | Martineau |
| 6,637,921 B2 | 10/2003 | Coushaine |
| 6,679,621 B2 | 1/2004 | West et al. |
| 6,682,211 B2 | 1/2004 | English et al. |
| 6,721,101 B2 | 4/2004 | Daniell |
| 6,730,940 B1 | 5/2004 | Steranka et al. |
| 6,808,293 B2 | 10/2004 | Watanabe et al. |
| 6,837,605 B2 | 1/2005 | Reill |
| 6,846,101 B2 | 1/2005 | Coushaine |
| 6,851,835 B2 | 2/2005 | Smith et al. |
| 6,903,376 B2 | 6/2005 | Shen et al. |
| 6,918,677 B2 | 7/2005 | Shipman |
| 6,924,943 B2 | 8/2005 | Manano et al. |
| 6,929,384 B2 | 8/2005 | Watanabe et al. |
| 6,948,840 B2 | 9/2005 | Grenda et al. |
| 6,955,451 B2 | 10/2005 | Coushaine et al. |
| 6,987,613 B2 | 1/2006 | Pocius et al. |
| 6,991,355 B1 | 1/2006 | Coushaine et al. |
| 6,995,402 B2 | 2/2006 | Ludowise et al. |
| 7,009,213 B2 | 3/2006 | Camras et al. |
| 7,042,021 B2 | 5/2006 | Isoda |
| 7,053,419 B1 | 5/2006 | Camras et al. |
| 7,063,441 B2 | 6/2006 | Kramer et al. |
| 7,063,450 B2 | 6/2006 | Ehara et al. |
| 7,064,355 B2 | 6/2006 | Camras et al. |
| 7,080,932 B2 | 7/2006 | Keuper |
| 7,083,313 B2 | 8/2006 | Smith |
| 7,106,523 B2 | 9/2006 | McLean et al. |
| 7,111,972 B2 | 9/2006 | Coushaine et al. |
| 7,114,838 B2 | 10/2006 | Wu |
| 7,118,236 B2 | 10/2006 | Hahm et al. |
| 7,118,262 B2 | 10/2006 | Negley |
| 7,121,691 B2 | 10/2006 | Coushaine et al. |
| 7,125,143 B2 | 10/2006 | Hacker |
| 7,125,160 B2 | 10/2006 | Wong et al. |
| 7,150,553 B2 | 12/2006 | English et al. |
| 7,153,000 B2 | 12/2006 | Park et al. |
| 7,172,324 B2 | 2/2007 | Wu et al. |
| 7,182,497 B2 | 2/2007 | Lee et al. |
| 2004/0037076 A1 | 2/2004 | Katoh et al. |
| 2004/0212291 A1 | 10/2004 | Keuper |
| 2005/0073849 A1 | 4/2005 | Rhoads et al. |
| 2005/0083699 A1 | 4/2005 | Rhoads et al. |
| 2005/0179041 A1 | 8/2005 | Harbers et al. |
| 2005/0224826 A1 | 10/2005 | Keuper et al. |
| 2005/0281047 A1 | 12/2005 | Coushaine et al. |
| 2006/0013000 A1 | 1/2006 | Coushaine et al. |
| 2006/0013002 A1 | 1/2006 | Coushaine et al. |
| 2006/0039143 A1 | 2/2006 | Katoh et al. |
| 2006/0105482 A1 | 5/2006 | Alferink et al. |
| 2006/0181902 A1 | 8/2006 | Tamura et al. |
| 2006/0186431 A1 | 8/2006 | Miki et al. |
| 2006/0198144 A1 | 9/2006 | Miyairi et al. |
| 2007/0201225 A1 | 8/2007 | Holder et al. |
| 2008/0101067 A1 | 5/2008 | Cariboni |

FOREIGN PATENT DOCUMENTS

| | | |
|---|---|---|
| JP | 60-199746 | 10/1985 |
| JP | 61-160328 | 7/1986 |
| JP | 8 264839 | 10/1996 |
| WO | WO2006/111805 | 10/2006 |

OTHER PUBLICATIONS

Future Lighting Solutions. "The 6 Steps to LED Lighting Success" brochure. Date: undated, 6 pages.

PLOT OF ILLUMINATION DISTRIBUTION FROM A
COMPARABLE APPARATUS NOT USING THE PRESENT INVENTION

LIGHT-DIRECTING LENSING MEMBER WITH IMPROVED ANGLED LIGHT DISTRIBUTION

FIELD OF THE INVENTION

The invention relates generally to the field of lighting systems and, more particularly, to apparatus for utilizing LED light sources for illuminating areas with predefined patterns of light intensity.

BACKGROUND OF THE INVENTION

There is a continuing need for lighting apparatus which is low-cost and energy-efficient. LEDs (light-emitting diodes) provide light sources which are energy-efficient, and advances in LED technology are providing even greater efficiencies over time.

Some of the newer applications for LED-based lighting systems are roadway, street and parking-lot lighting. In such applications, there are desired performance characteristics with respect to light distribution. More specifically, it is desirable that certain regions about a light fixture be illuminated, while certain neighboring regions are essentially non-illuminated. Along roadways and in parking lots, there is a need to be able to direct light in a particular preferential lateral direction (e.g., to illuminate a roadway) while avoiding so-called "trespass light" in an opposite lateral direction (a non-preferential lateral direction), e.g., toward roadside houses.

Some efforts have been made to develop small lenses for directing light emitted by small LED packages, and utilizing lenses intended to redirect some amount of emitted light to one side preferentially. However, such lenses fall short of highly desirable performance with respect to avoiding trespass lighting. Some of such lenses are difficult and expensive to manufacture, which increases overall cost for LED lighting using such lenses.

The measure of trespass lighting includes more than just the amount of light energy falling toward the non-preferential side but also includes how far into the area on the non-preferential side that the light falls. It would be highly beneficial to provide a lighting apparatus which produces a desired illumination pattern with a maximum amount of emitted light toward an area intended to be illuminated and with improved uniformity of light distribution.

OBJECTS OF THE INVENTION

It is an object of this invention to provide a light-directing lensing member, preferably for LED-based devices, which distributes light from light emitters in a preferential lateral direction and which overcomes some of the problems and shortcomings of the prior art.

Another object of this invention is to provide a light-directing lensing member which maximizes the light directed toward a preferential side and minimizes light directed toward the opposite (non-preferential) side.

Another object of this invention is to provide a high-efficiency light-directing lensing member while satisfying requirements for minimizing trespass light.

Still another object of this invention is to provide a light-directing lensing member which directs a maximum amount of emitted light toward an area intended to be illuminated.

Yet another object of this invention is to provide a light-directing lensing member which distributes light over an area on a preferential side, doing so with improved uniformity.

Another object of this invention is to provide a light-directing lensing member which directs a maximum amount of light to a preferential side, doing so with a single refraction to achieve improved control of the directed light.

Another object of this invention is to provide LED light-directing lensing member which produces a desired illumination pattern.

These and other objects of the invention will be apparent from the following descriptions and the drawings.

SUMMARY OF THE INVENTION

This invention is an improved light-directing lensing member for directing light from an LED light emitter in a preferential-side off-axial direction with respect to the emitter axis. Such light distribution provides a significant widening of the preferential-side illumination angle with respect to the emitter axis and narrows the lateral illumination angle with respect to the emitter axis. Thus, the inventive lensing member provides a relatively elongated illumination pattern with farther light distribution on the preferential-side.

The inventive light-directing lensing member includes a base end having a perimeter-loop line defining a main plane transverse the emitter axis, and an outer surface configured for refracting light from the emitter in a predominantly off-axis direction toward the preferential side. The outer surface includes a major lens-portion and an axially-located minor lens-portion. The perimeter-loop line has distances from the emitter axis greater on a preferential front side than on a non-preferential back side.

The major lens-portion outer surface has back, front and middle regions. The front region of the major lens-portion outer surface is centered on the front side of the lensing member and extends from the base end initially substantially orthogonally with respect to the main plane and then inwardly at a position and in a configuration such that the angle of incidence of light from the emitter thereon is less than the critical angle. The front region terminates inwardly at a ridge-line which is the set of major-lens-surface points farthest from the main plane. The back region of the major lens-portion outer surface is centered on the back side of the lensing member and extends from the base end at a position and in a configuration such that the angle of incidence of light from the emitter thereon is greater than the critical angle, thereby causing total internal reflection (TIR) of such light to significantly reduce the amount of light emanating from the back region, i.e., reducing the light directed toward the back side. It is preferred that the back region extends from the base end initially substantially orthogonally with respect to the main plane. The middle region is located around the emitter axis and contiguous with the front and back regions.

The minor lens-portion extends from the middle region in position over the emitter axis. The outer surface of the minor lens-portion has a surrounding-loop surface and an end surface. The surrounding loop-surface extends from the middle region of the major lens-portion transverse to the main plane and terminates at the end surface. The end surface is configured to direct substantially axially-parallel light from the emitter in off-axis direction toward the preferential side. The end surface is preferably angled toward the non-preferential side.

The term "angled toward," as used herein with respect to the end surface of the minor lens-portion, refers to the light-exit side of the interface between air and lens from which the light moves. More specifically, when the light moves from the lens material to air, then the "angled toward" refers to the air side of the interface.

The term "preferential side," as used herein with respect to the light-distribution direction, means the lateral direction (with respect to the emitter axis) toward which illumination is desired. The term "non-preferential side," as used herein with respect to the direction of the light distribution, means the lateral direction toward which illumination is not desired. The non-preferential side is typically substantially radially opposite from the preferential side.

In preferred embodiments, the end surface includes an inner section and lateral sections on either side of the inner section. The inner section extends over the emitter axis and spans the entire front-to-back cross-dimension of the end surface. Each lateral section extends laterally from the inner section preferably in a direction away from the main plane to terminate at the surrounding-loop surface.

The inner section preferably forms a trough extending in the front-to-back direction. It is further preferred that the inner section includes front and back portions, the back portion transitioning from the front portion at a position offset from the emitter axis in a direction toward the back. The front and back portions of the inner section are each angled with respect to the main plane, the angle of the front portion is preferably greater than the angle of the back portion.

Each lateral section preferably includes front and back portions, the back portion transitioning from the corresponding front portion at a position offset from the emitter axis in a direction toward the back. It is further preferred that the front and back portions of each lateral section are each angled with respect to the main plane, the angle of the front portions are preferably greater than the angle of the back portions.

In preferred embodiments, the surrounding-loop surface has front and back lines which are transverse to the main plain and are centered on the front and back sides, respectively, of the minor lens portion, and which serve to divide the surrounding-loop surface into two opposite parts (halves). Each of such parts of the surrounding-loop surface includes a front face extending from the front line in a direction away from the emitter axis, and a lateral face which extends from the corresponding front face around the emitter axis to meet the other lateral face at the back line. Each of the front faces extends from the front line preferably initially in a direction away from the emitter axis. Each front face is preferably convex. Each lateral face is also preferably convex. The two halves of the surrounding-loop surface are preferably configured such that the minor lens-portion is bilaterally symmetric.

The major lens-portion further preferably includes two lateral regions. Each lateral region extends from the base end initially substantially orthogonally with respect to the main plane and then inwardly to the middle region. Each lateral region is contiguous with the front and back regions.

In is highly preferred that the perimeter-loop line have a smaller radius of curvature along the front region than along the lateral regions, thereby to direct lateral light from the emitter in a direction farther from the emitter axis.

In the preferred embodiments, the perimeter-loop line is bilaterally symmetric. The major lens-portion is also preferably bilaterally symmetric. In such embodiments, the minor lens-portion is bilaterally symmetric.

In preferred embodiments, the light emitter used with the lensing member of this invention is an LED package including at least one LED and a primary lens over the LED, making the lensing member of this invention a secondary lens placed over the primary lens. The primary lens has an illumination pattern which is substantially rotationally symmetric around the emitter axis, and in certain embodiments, the primary lens is substantially hemispherical. There may be a space between the primary and secondary lenses and the space is filled with optical-grade gel.

The term "LED package" is well known in the industry. LED packages have either a single light-emitting diode (LED) or a few closely-spaced LEDs on a base. Many LED packages include a primary reflector, which may be in the form of a so-called reflector cup mounted to the base or a reflective surface associated with the primary lens proximal the LED(s). One example of LED packages illustrated herein in connection with the present invention includes a ring, preferably made of aluminum, around the primary lens on the base, which ring serves to position the primary lens and to reflect some light from the emitter to assist in the generation of an illumination pattern. Persons skilled in the art will appreciate that a broad variety of available LED packages are useful with the light-directing lensing member of the present invention.

The lensing member preferably includes an outward flange around base end. The outward flange may include a reference mark indicating an orientation with respect to the preferential side. Alternatively, the flange may have a specific shape, such as cut corners or some type of irregularity, to indicate the orientation with respect to the preferential side. Such features are helpful in assembly of lighting fixtures using such light-directing apparatus.

The inventive apparatus will most typically be used in applications where a multiplicity of such devices are arranged on what is referred to as an LED module. In turn, one or more of such modules are used within a lighting fixture to achieve desired illumination. Besides the one mentioned above, there are a great many applications for such devices.

The term "transverse," as used herein in reference to the main plane with respect to the emitter axis, means that the main plane intersects the emitter axis at an angle which is determined by the specific application for the inventive lensing member. In the most preferred embodiments, the main plane is substantially perpendicular to the emitter axis. The term "transverse," as used herein in reference to the surrounding-loop surface of the minor lens-portion means that such surrounding-loop surface extends in a direction which is not parallel to the main plane. In other words, if extended to the main plane, the surrounding loop-surface would intersect the main plane at an angle or angles determined by the specific application for the lensing member. In some of the preferred embodiments, the surrounding-loop surface extends substantially perpendicular to the main plane. In some of such embodiments, the surrounding loop-surface extends substantially parallel to the emitter axis.

The term "loop," as used herein in reference to the perimeter-loop line and the surrounding-loop surface, means that such line or surface is of continuous closed nature without any breaks, such that the loop line or loop surface extends along a closed curve completely surrounding an area inside the loop.

The term "initially," as used herein in reference to directions in which lensing member surfaces extend, refers to the portion a lensing-member surface closest to the referenced element or feature; "initially" is not used as a time-related term, no is the term "then," which is used for similar geometric purposes. For example, the term "initially," when used in reference to the back, front and lateral regions of the major lens-portion, means that only a portion of the region which is in close proximity to the base end extends substantially orthogonally to the main plane. This means that a portion of the region which is distal to the base end may gradually change its orientation to extend inwardly, even in a direction substantially parallel to the main plane.

The term "farthest," as used herein in reference to the set of major-lens-surface points forming the ridgeline, means that the ridgeline is at the farthest distance to the main plane that the rest of the outer surface of the major lens portion. This means that, in the outer surface of the major lens-portion, any point which is not a part of the ridgeline is closer to the main plane than the ridgeline is.

DETAILED DESCRIPTION OF PREFERRED EMBODIMENTS

FIGS. 1-12 show preferred embodiment of an inventive light-directing lensing member 10 in accordance with this invention for off-axial preferential-side distribution of light from a light emitter 20 which has an emitter axis 21.

Lensing member 10 includes a base end 30 having a perimeter-loop line 32 defining a main plane 13 transverse emitter axis 21, and an outer surface 12 configured for refracting light from emitter 20 in a predominantly off-axis direction toward a preferential front side 14. Outer surface 12 includes a major lens-portion 40 and an axially-located minor lens-portion 50.

Figure 2:
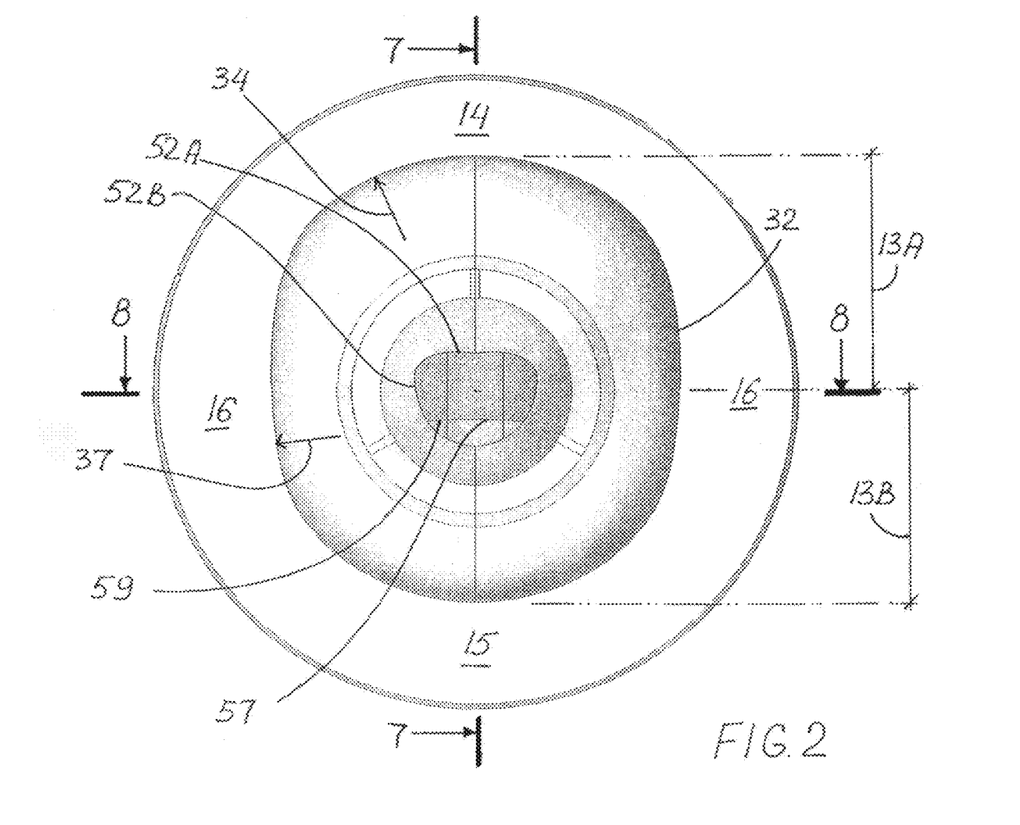
FIG. 2 is a top plan view of FIG. 1.

Perimeter-loop line 32 has distances 13A and 13B from the emitter axis. As best seen in FIG. 2, distance 13A on preferential front side 14 is greater than distance 13B on a non-preferential back side 15.

Major lens-portion outer surface 41 has a back region 42, a front region 44 and a middle region 46. Front region 44 is centered on front side 14 and extends from base end 30 initially substantially orthogonally with respect to main plane 13 and then inwardly at a position and in a configuration such that the angle of incidence of light from emitter thereon is less than the critical angle. Front region 44 terminates inwardly at a ridgeline 45 which is the set of major-lens-surface points 45 farthest from main plane 13. Back region 42 is centered on back side 15 and extends from base end 30 at a position and in a configuration such that the angle of incidence of light from emitter 20 thereon is greater than the critical angle, thereby causing total internal reflection (TIR) of such light to significantly reduce the amount of light emanating from back region 42, i.e., reducing the light directed toward back side 15. Middle region 46 is located around emitter axis 21 and contiguous with front region 44 and back region 42.

The term "critical angle," of course, means the angle of light incidence on the interface (inside the lensing member) above which TIR occurs, rather than refractive passing through the lens surface. The critical angle is calculated from refractive indices of a lensing-member material and air. (Every lensing material, of course, has a refractive index.) In some preferred embodiments, the lensing member is made of an acrylic material which with air has a critical angle of about 43°.

Figure 10:
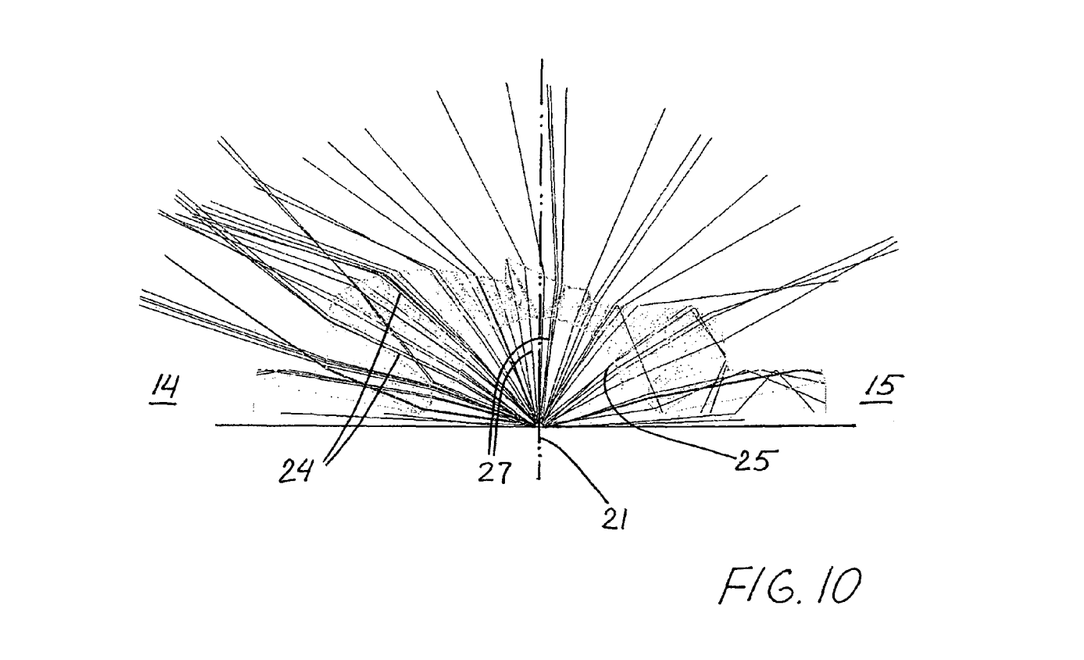
FIG. 10 is another side sectional view better illustrating aspects of the light distribution.

As best seen in FIG. 10, back region 42 is positioned and configured such that a majority of back-directed light 25 from emitter 20 reaches back region 42 of outer surface 41 at angles of incidence which are greater than the critical angle. Back region 42 of outer surface 41 is spaced closer to main plane 13 to result in such greater angles of incidence on back side 15 and thereby cause TIR of the majority of back-directed light 25 from emitter 20. While this results in almost complete loss of such back-directed light 25, such loss is preferred over greatly undesired illumination toward non-preferential side 15.

On the other hand, it is highly desirable that substantially all front-directed light 24 from emitter 20 exit lensing member 10 toward preferential side 14. Thus, as further seen in FIG. 10, front region 44 of outer surface 41 is positioned and configured such that front-directed light 24 from emitter 20 reaches front region 44 at angles of incidence which are less than the critical angle. In addition, outer surface 61 on front side 14 with respect to emitter axis 21 is configured so that front-directed light 24 exits lensing member 10 at greater angles with respect to emitter axis 21. In other words, lensing member 10 is configured for directing light toward preferential side so that such light travels closer to main plane 13 to produce illumination farther from emitter axis 21.

Minor lens-portion 50 extends from middle region 46 in position over emitter axis 21. An outer surface 51 of minor lens-portion 51 has a surrounding-loop surface 52 and an end surface 54. Surrounding loop-surface 52 extends from middle region 46 of major lens-portion 40 transverse main plane 13 and terminates at end surface 54. End surface 54 is configured to direct substantially axially-parallel light 27 from emitter 20 in off-axis direction toward preferential side 14. A best seen in FIG. 3, end surface 54 is angled toward non-preferential side 15.

Figure 1:
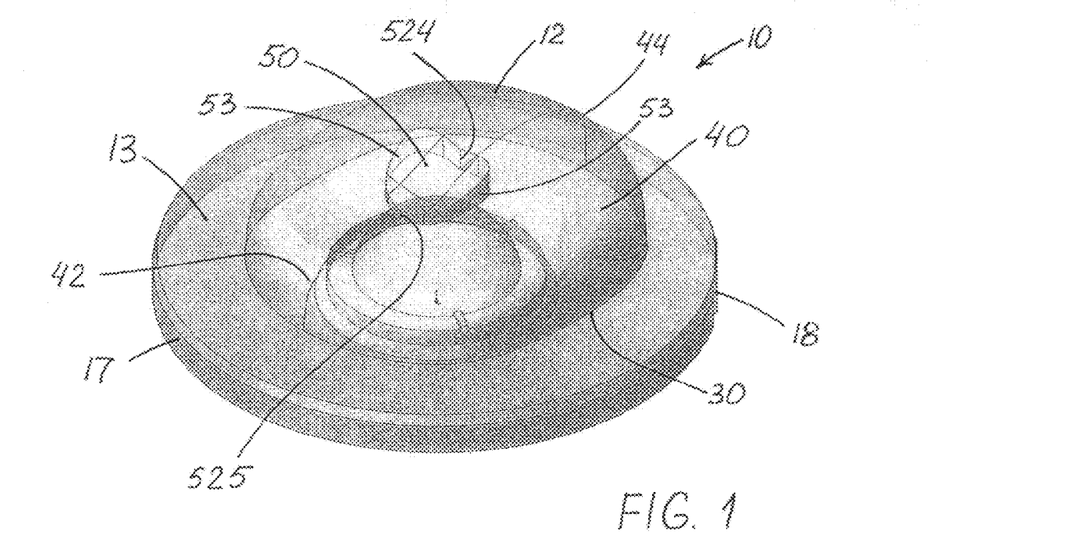
FIG. 1 is a perspective view of one embodiment of the light-directing lensing member of the present invention.
Figure 3:
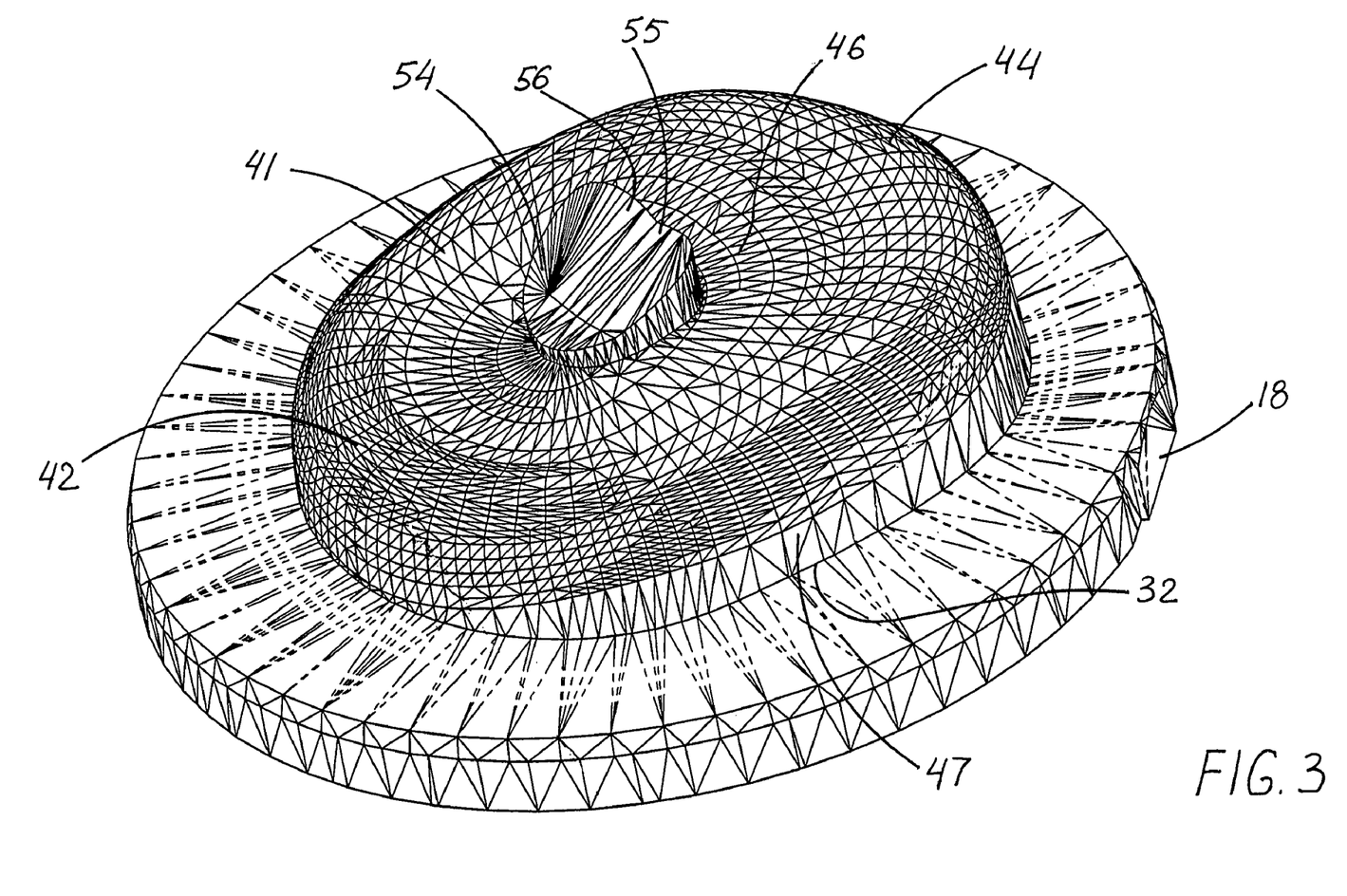
FIG. 3 is a perspective representation of a "wire-frame" model of the light-directing lensing member of FIG. 1.
Figure 4:
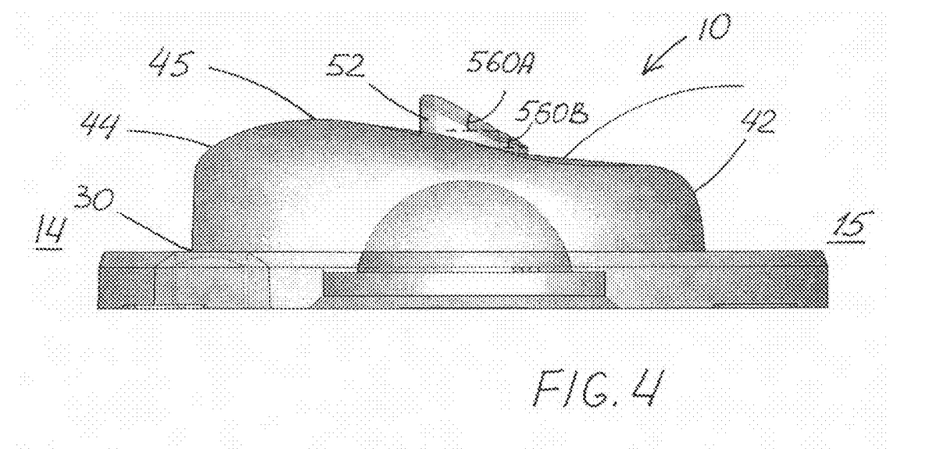
FIG. 4 is a side elevation of the light-directing lensing member of FIG. 1.
Figure 5:
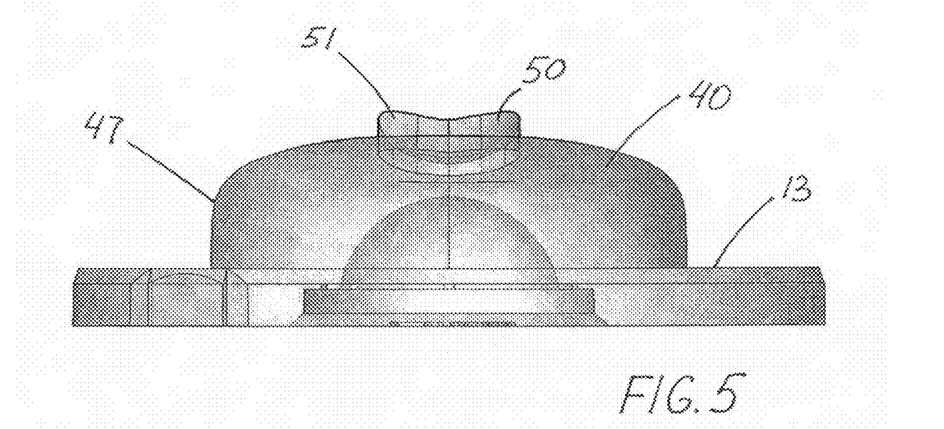
FIG. 5 is a front elevation of the light-directing lensing member of FIG. 1 (a left-side view of FIG. 4) showing its preferential side.
Figure 6:
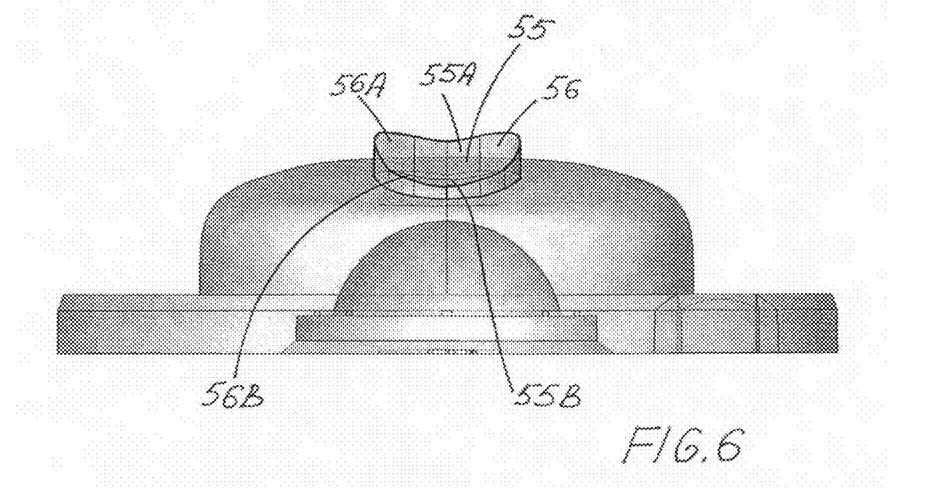
FIG. 6 is a back elevation of the light-directing lensing member of FIG. 1 (a right-side view of FIG. 4) showing its non-preferential side.
Figure 7:
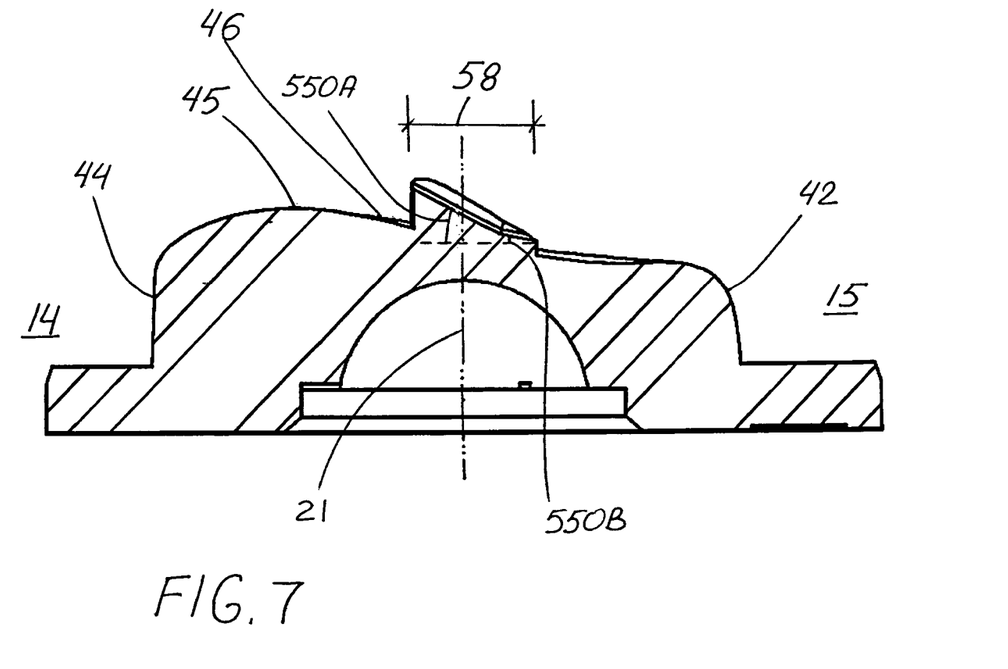
FIG. 7 is a sectional view of the light-directing lensing member of FIG. 1, taken along section 7-7 as shown in FIG. 2.

FIGS. 1-3 best show that end surface 54 includes an inner section 55 and lateral sections 56 on either side of inner section 55. Inner section 55 extends over emitter axis 21 and spans the entire front-to-back cross-dimension 58 of end surface 54 (see FIG. 7). Each lateral section 56 extends laterally from inner section 55 in a direction away from main plane 13 to terminate at surrounding-loop surface 52 (see FIG. 8).

Figure 8:
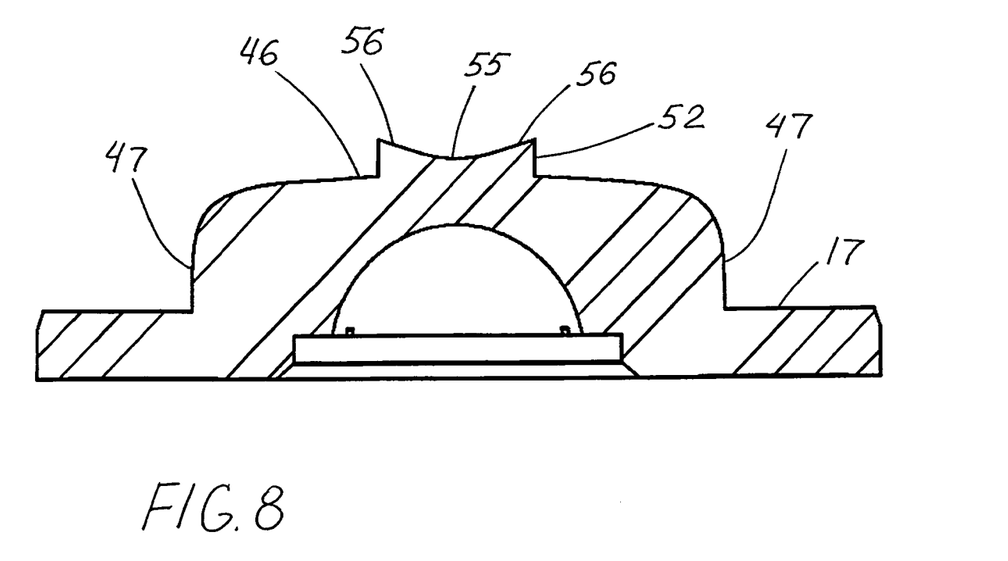
FIG. 8 is a sectional view of the light-directing lensing member of FIG. 1, taken along section 8-8 as shown in FIG. 2.
Figure 9:
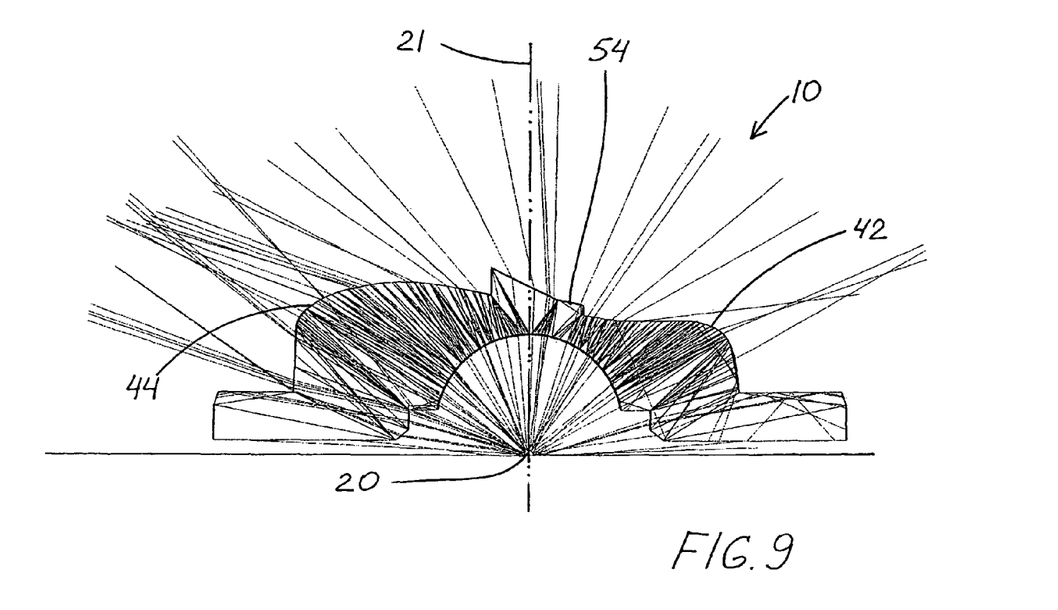
FIG. 9 is a side sectional view of the light-directing lensing member as in FIG. 4 representing the light distribution of the lensing member.

As best seen in FIG. 8, inner section 55 forms a trough which extends in the front-to-back direction. Inner section 55 further includes front portion 55A and back portion 55B, back portion 55B transitioning from front portion 55A at a position 57 offset from emitter axis 21 in a direction toward back 15. Front and back portions 55A and 55B of inner section 55 are each angled with respect to main plane 13, angle 550A of front portion 55A is greater than angle 550B of back portion 55B, as best seen in FIG. 8.

Each lateral section 56 includes a front portion 56A and a back portion 56B, each back portion 56B transitioning from corresponding front portion 56A at a position 59 which is offset from emitter axis 21 in a direction toward back 15. Front and back portions 56A and 56B of each lateral section 56 are each angled with respect to main plane 13. Angles 560A of each of front portions 56A are greater than angles 560B of corresponding back portions 56B (see FIG. 4).

Surrounding-loop surface 52 has a front line 524 and a back line 525 which are transverse to main plain 13, centered on front side 14 and back side 15, respectively, and divide surrounding-loop surface 52 into two parts (halves) 53. Each part 53 of surrounding-loop surface 52 includes a pair of front faces 52A and a pair of lateral faces 52B. As best seen in FIG. 2, each of front face 52A extends from front line 524 initially in a direction away from emitter axis 21. Each of lateral faces 52B extends from one of front faces 52A to go around emitter axis 21 to meet the other lateral face 52B at back line 525. Each front face 52A is convex, as seen in FIGS. 1-3. Each lateral face 52B is also convex. In the embodiment illustrated in FIGS. 1-12, minor lens-portion 50 is bilaterally symmetric.

Major lens-portion 40 further includes two lateral regions 47. As best seen in FIG. 8, each lateral region 47 extends from base end 30 initially substantially orthogonally with respect to main plane 13 and then inwardly to middle region 46. Each lateral region is contiguous with front region 44 and back region 42.

Figure 11:
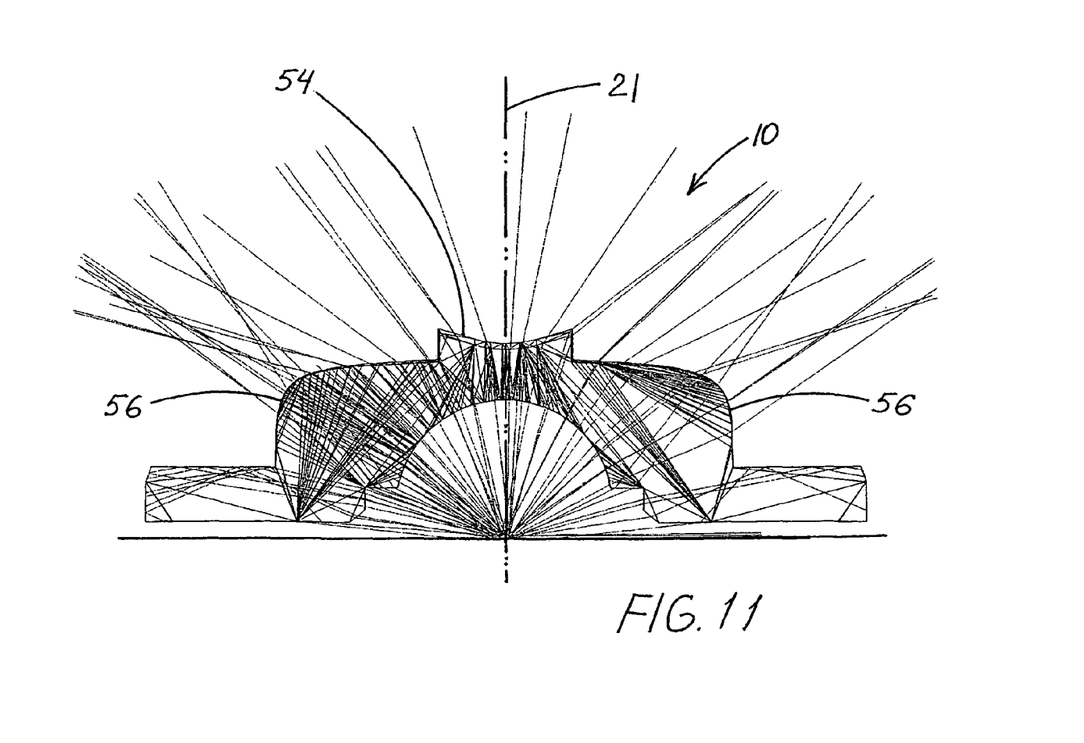
FIG. 11 is a back sectional view of the light-directing lensing member as in FIG. 6 representing the light distribution from that position.
Figure 12:
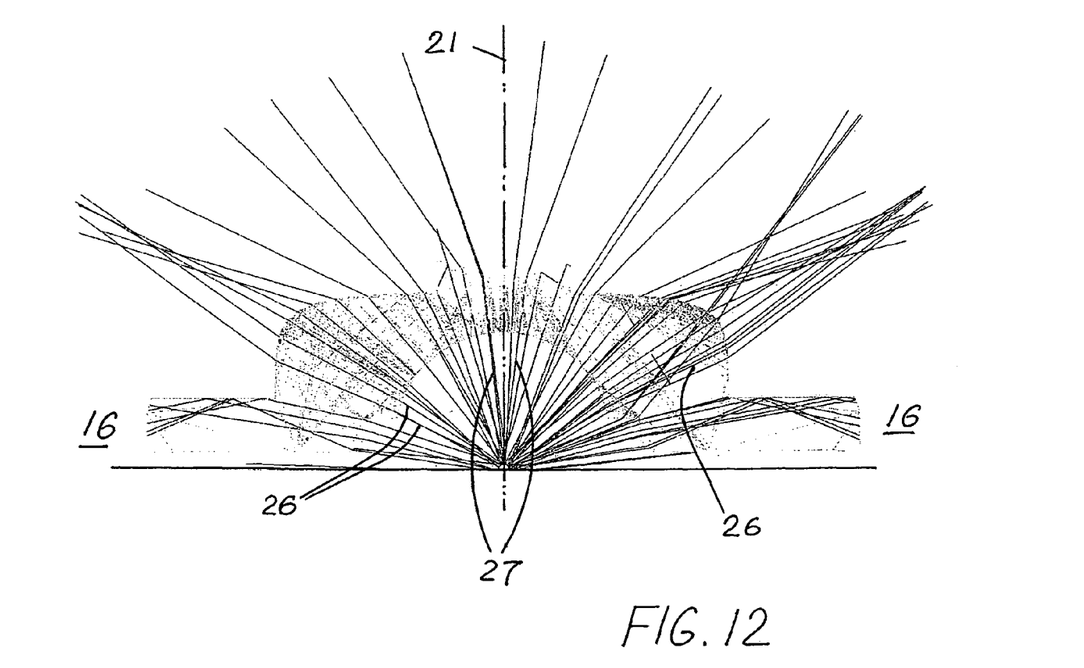
FIG. 12 is another back sectional view better illustrating aspects of the light distribution.
Figure 16:
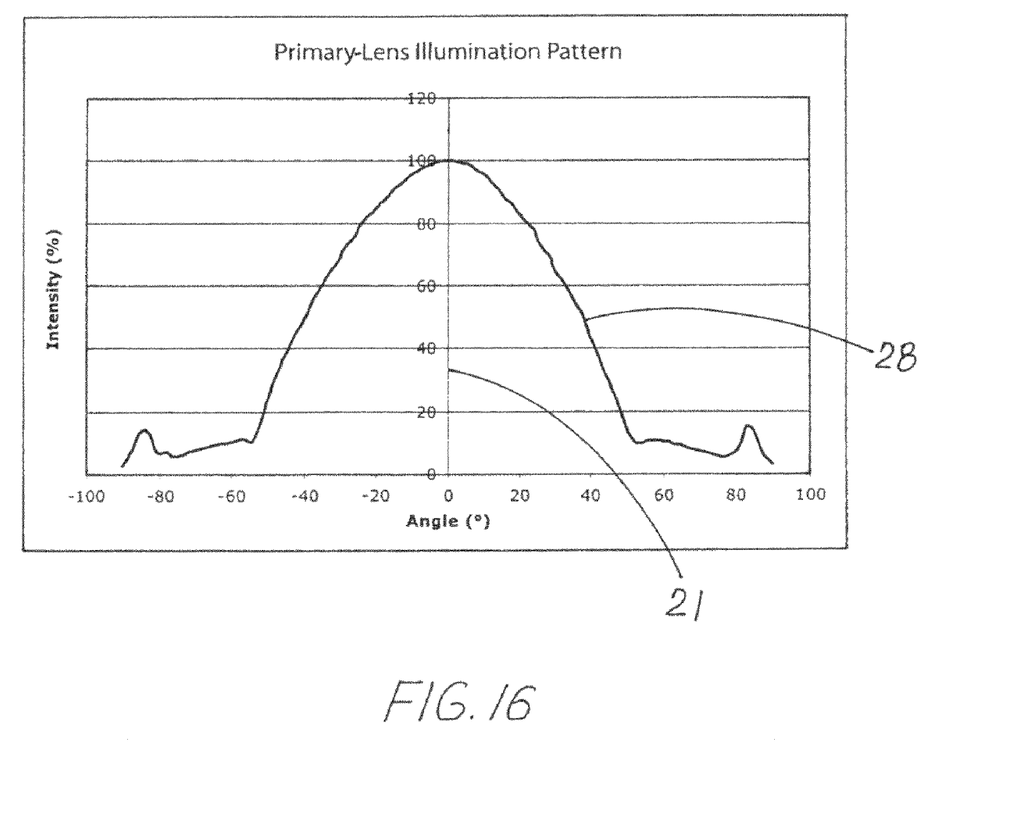
FIG. 16 is a graphical representation of the illumination pattern of the primary lens of the LED package of FIG. 15.

FIG. 2 best shows that perimeter-loop line 32 has a smaller radius of curvature 34 along front region 44 than radius of curvature 37 along lateral regions 47, thereby to direct lateral light from emitter 20 in a direction closer to emitter axis 21. FIGS. 11 and 12 best show that lateral regions 47 are each configured and shaped such that laterally-directed light 26 from emitter 20 reaches each lateral region 47 at angles of incidence which are less than the critical angle. In addition, outer surface 61 along lateral sides 16 is configured so that laterally-directed light 26 exits lensing member 10 at smaller angles with respect to emitter axis 21. In other words, lensing member 10 is configured for directing lateral light in a manner so that such light travels closer to emitter axis 21 to produce well-defines illumination pattern 11 along lateral sides 16—i.e., a pattern which minimizes light well beyond the intended area of illumination. Illumination pattern 11 is shown in FIG. 16.

In the embodiment shown in FIGS. 1-12, perimeter-loop line 32 is bilaterally symmetric. Major lens-portion 40 is also bilaterally symmetric. As best seen in FIG. 2, minor lens-portion 50 is also bilaterally symmetric.

In FIGS. 9-12, it is also seen that end surface 54 of minor lens portion 50 directs axially-parallel light away from the axis to eliminate the so-called hot spot of light concentration immediately about emitter axis 21.

Figure 13:
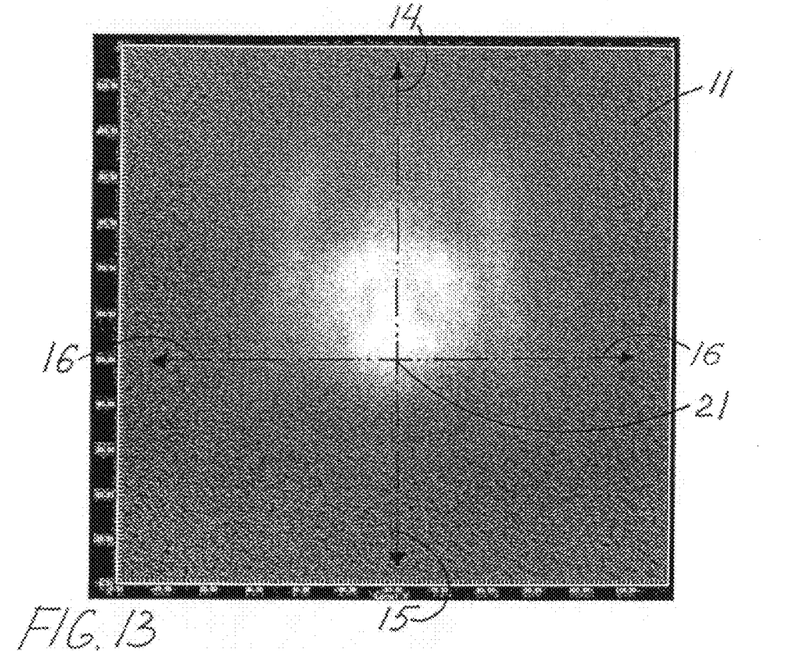
FIG. 13 is a two-dimensional plot of illumination intensity distribution of the inventive light-directing lensing member of FIG. 1 on an illuminated surface substantially normal to the emitter axis.

FIG. 13 illustrates illumination pattern 11 of the relative intensity distribution by inventive light-directing lensing member 10, demonstrating that a great majority of the light emanating from apparatus 10 is redirected well toward the preferential side 14, with no more than minimal light reaching the non-preferential side 15. In other words, the amount of "trespass light" is minimized. It is seen in FIG. 13 that illumination pattern 11 is relatively elongated toward preferential side 14 and is relatively narrow (well-defined) along lateral sides 16. Illumination pattern 11 of FIG. 13 further shows the result of the minor lens portion directing axially-parallel light 24 from light emitter 20 primarily toward preferential side 14. Thus, the minor lens portion removes or minimizes any "hot spot" over emitter axis 21. (Such hot spot is seen in comparative FIG. 14 discussed below.)

Figure 14:
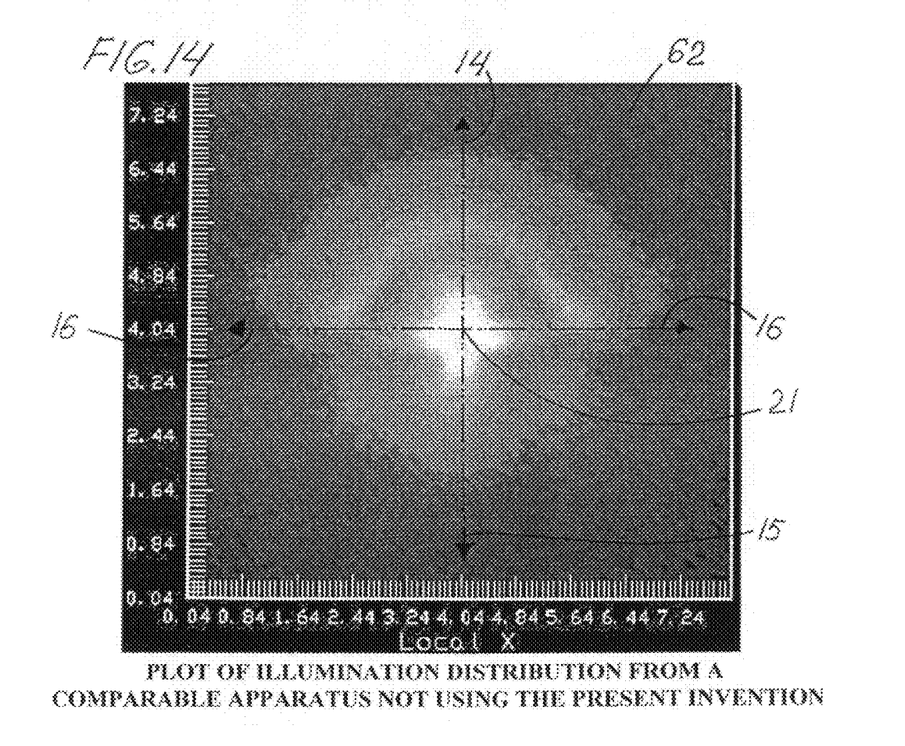
FIG. 14 is a similar two-dimensional plot of illumination intensity distribution of a comparable lensing member not incorporating the present invention.

FIG. 13, when considered in comparison to FIG. 14, helps illustrate the advantages of the invention. FIG. 14 is a two-dimensional illumination pattern 62 of intensity distribution by a secondary lens which is substantially comparable in design to lensing member 10 but for the fact that it does not have the minor lens portion. (It also has a somewhat different outer-surface configuration of its back region and has a circular perimeter-loop line; thus, it must be taken into consideration that the comparison is not a perfect one. The secondary lens which produced illumination pattern 62 is disclosed in a co-pending U.S. patent application Ser. No. 11/695,483, the contents of which are incorporated herein by reference.) Illumination pattern 62 in FIG. 14 shows, among other things, a greater amount of light toward non-preferential side 15 in the center over emitter axis 21 than is the case in FIG. 13, which was generated using the present invention. FIG. 14 further shows that illumination pattern 62 is relatively wide (and less well-defined along its lateral sides 16 and has its preferential-side illumination distribution closer to emitter axis 21 than is seen in illumination pattern 11, which is generated by the present invention.

Light patterns 11 and 62 were generated using optical ray-tracing software to simulate the illumination intensity emanating from the respective lensing members.

Figure 15:
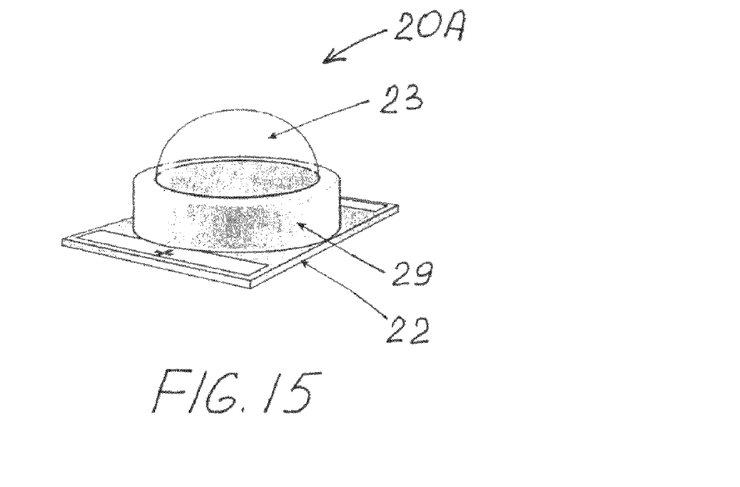
FIG. 15 is perspective view of an LED package used with the inventive light-directing lensing member.

FIG. 15 illustrates light emitter 20 as an LED package 20A which includes at least one LED on a base 22 and a primary lens 23 over the LED. When light emitter 20 is an LED package having a primary lens, lensing member 10 is a secondary lens placed over primary lens 23. FIGS. 1-8 and 15 show primary lens 23 as substantially rotationally symmetrical around emitter axis 21. Primary lens 23 is substantially hemispherical. LED package 20A shown in FIG. 15 includes a ring 29 around primary lens 23 on base 22. Ring 29 serves to position lens 23 and reflect some light from the LED to assist in generation of illumination pattern 28, illustrated in FIG. 16.

Lensing member 10 includes an outward flange 17 around base end 30. Flange 17, and thus lensing member 10, are secured with respect to a mounting board which is part of a lighting fixture that includes a plurality of light-directing lensing members 10 of the sort described. Outward flange 17 includes a specific shape 18 to indicate the orientation with respect to preferential side 14. Such feature is helpful in assembly of lighting fixtures using such light-directing lensing members.

Figure 17:
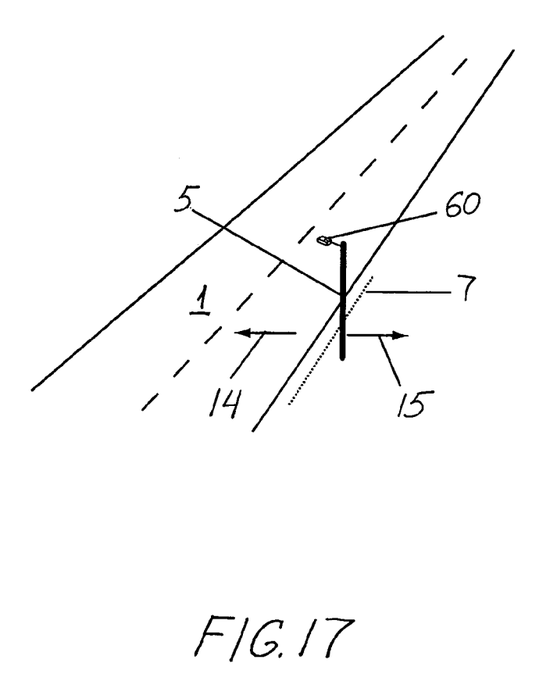
FIG. 17 is a schematic perspective representation of a pole-mounted lighting fixture utilizing the present invention in a roadway application.

Referring now to FIG. 17, a roadway 1 is schematically illustrated with a light fixture 60 which utilizes light-directing lensing members 10 in accordance with this invention and is mounted at the top of a light pole 5 installed along roadway 1. Lighting fixture 60 is positioned over the curb, which is illustrated by a curb line 7 (shown in dotted line). The direction arrow marked by reference number 14 indicates preferential side 15 (toward the roadway), and the direction arrow marked by reference number 15 points toward the opposite, non-preferential side 15.

While the principles of this invention have been described in connection with specific embodiments, it should be understood clearly that these descriptions are made only by way of example and are not intended to limit the scope of the invention.

The invention claimed is:

1. A light-directing lensing member for off-axial preferential-side distribution of light from a light emitter having an emitter axis, comprising:
   a base end having a perimeter-loop line defining a main plane transverse the emitter axis, the perimeter-loop line having distances from the emitter axis greater on a preferential front side than on a non-preferential back side; and
   an outer surface configured for refracting light from the emitter in a predominantly off-axis direction toward the preferential side, the outer surface including:
      a major lens-portion outer surface having:
         a front region centered on the front side and extending from the base end initially substantially orthogonally with respect to the main plane and then inwardly at a position and in a configuration such that the angle of incidence of light from the emitter thereon is less than the critical angle, the front region terminating inwardly at a ridgeline which is the set of major-lens-surface points farthest from the main plane;
         a back region centered on the back side and extending from the base end at a position and in a configuration such that the angle of incidence of light from the emitter thereon is greater than the critical angle, thereby to reduce light directed toward the back side; and
         a middle region around the emitter axis and contiguous with the front and back regions; and
      an axially-located minor lens-portion with its outer surface having a surrounding-loop surface extending from the middle region transverse the main plane and terminating at the end surface configured to direct substantially axially-parallel light from the emitter in off-axis direction toward the preferential side.

2. The lensing member of claim 1 wherein the back region extends from the base end initially substantially orthogonally with respect to the main plane.

3. The lensing member of claim 1 wherein:
   the light emitter is an LED package including a primary lens; and
   the lensing member is a secondary lens placed over the primary lens.

4. The lensing member of claim 1 wherein the major lens-portion further includes two lateral regions extending from the base end initially substantially orthogonally with respect to the main plane and then inwardly to the middle region, each lateral region being contiguous with the front and back regions.

5. The lensing member of claim 4 wherein the perimeter-loop line has a smaller radius of curvature along the front region than along the lateral regions, thereby to direct lateral light from the emitter in a direction closer to the emitter axis.

6. The lensing member of claim 1 wherein the perimeter-loop line is bilaterally symmetric.

7. The lensing member of claim 6 wherein the major lens-portion is bilaterally symmetric.

8. The lensing member of claim 7 wherein the minor lens-portion is bilaterally symmetric.

9. The lensing member of claim 1 wherein the end surface is angled toward the non-preferential side.

10. The lensing member of claim 9 wherein the end surface includes:
    an inner section extending over the emitter axis and spanning the entire front-to-back cross-dimension of the end surface; and
    lateral sections on either side of the inner section, each extending from the inner section in a direction away from the main plane to terminate at the surrounding-loop surface.

11. The lensing member of claim 10 wherein the inner section forms a trough extending in the front-to-back direction.

12. The lensing member of claim 10 wherein the inner section includes front and back portions, the back portion transitioning from the front portion at a position offset from the emitter axis in a direction toward the back.

13. The lensing member of claim 12 wherein the front and back portions of the inner section are each angled with respect to the main plane, the angle of the front portion being greater than the angle of the back portion.

14. The lensing member of claim 10 wherein each lateral section includes front and back portions, each back portion transitioning from the corresponding front portion at a position offset from the emitter axis in a direction toward the back.

15. The lensing member of claim 14 wherein the front and back portions of each lateral section are each angled with respect to the main plane, the angle of each front portion being greater than the angle of the corresponding back portion.

16. The lensing member of claim 10 wherein the surrounding-loop surface has front and back lines which are transverse to the main plain, centered on the front and back sides, respectively, and serve to divide the surrounding-loop surface into two opposite parts, each of the parts including (a) a front face extending from the front line initially in a direction away from the emitter axis, and (b) a lateral face extending from the corresponding front face around to the back line.

17. The lensing member of claim 16 wherein each front face is convex.

18. The lensing member of claim 16 wherein each lateral face is convex.

19. The lensing member of claim 16 wherein the minor lens-portion is bilaterally symmetric.

* * * * *